Aug. 13, 1963 J. C. ATKINS 3,100,671

RECORD STORAGE HOLDER AND RACK

Filed May 22, 1961

2 Sheets-Sheet 1

Joseph C. Atkins

INVENTOR.

BY Clarence A. O'Brien and Harvey B. Jacobson

Attorneys

Aug. 13, 1963

J. C. ATKINS 3,100,671

RECORD STORAGE HOLDER AND RACK

Filed May 22, 1961

2 Sheets-Sheet 2

Joseph C. Atkins
INVENTOR.

BY Clarence A. O'Brien
and Harvey B. Jacobson
Attorneys

United States Patent Office 3,100,671

Patented Aug. 13, 1963

3,100,671

RECORD STORAGE HOLDER AND RACK

Joseph C. Atkins, 407 Blackman Road, Nashville, Tenn.

Filed May 22, 1961, Ser. No. 111,833
5 Claims. (Cl. 312—14)

This invention comprises a novel and useful record storage holder and rack and more particularly relates to a storage means for supporting in a protected but readily accessible manner a plurality of phonograph record discs.

The primary object of this invention is to provide a record storage device whereby phonograph record discs may be compactly stored in a manner which will permit ready visual inspection and ready access to a selected record.

A further object of the invention is to provide a record storing device in accordance with the foregoing object wherein the records may be stored on edge in a generally parallel arrangement and whereby individual records may be swung horizontally from side-to-side about a vertical axis to facilitate inspection of the labels on each side of the record disc album, to facilitate removal of or insertion of a record into its individual supporting structure.

Still another object of the invention is to provide a record storage device in accordance with the foregoing objects which shall be of compact, simple and inexpensive construction and yet will effectively protect and support record discs in an improved manner.

Yet another object of the invention is to provide a record storage device in accordance with the preceding objects which shall utilize a novel transparent cabinet structure to effectively protect the entire assemblage from the accumulation of dust or dirt thereon and yet will afford ready visibility for the record stored therein.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 2, 5:
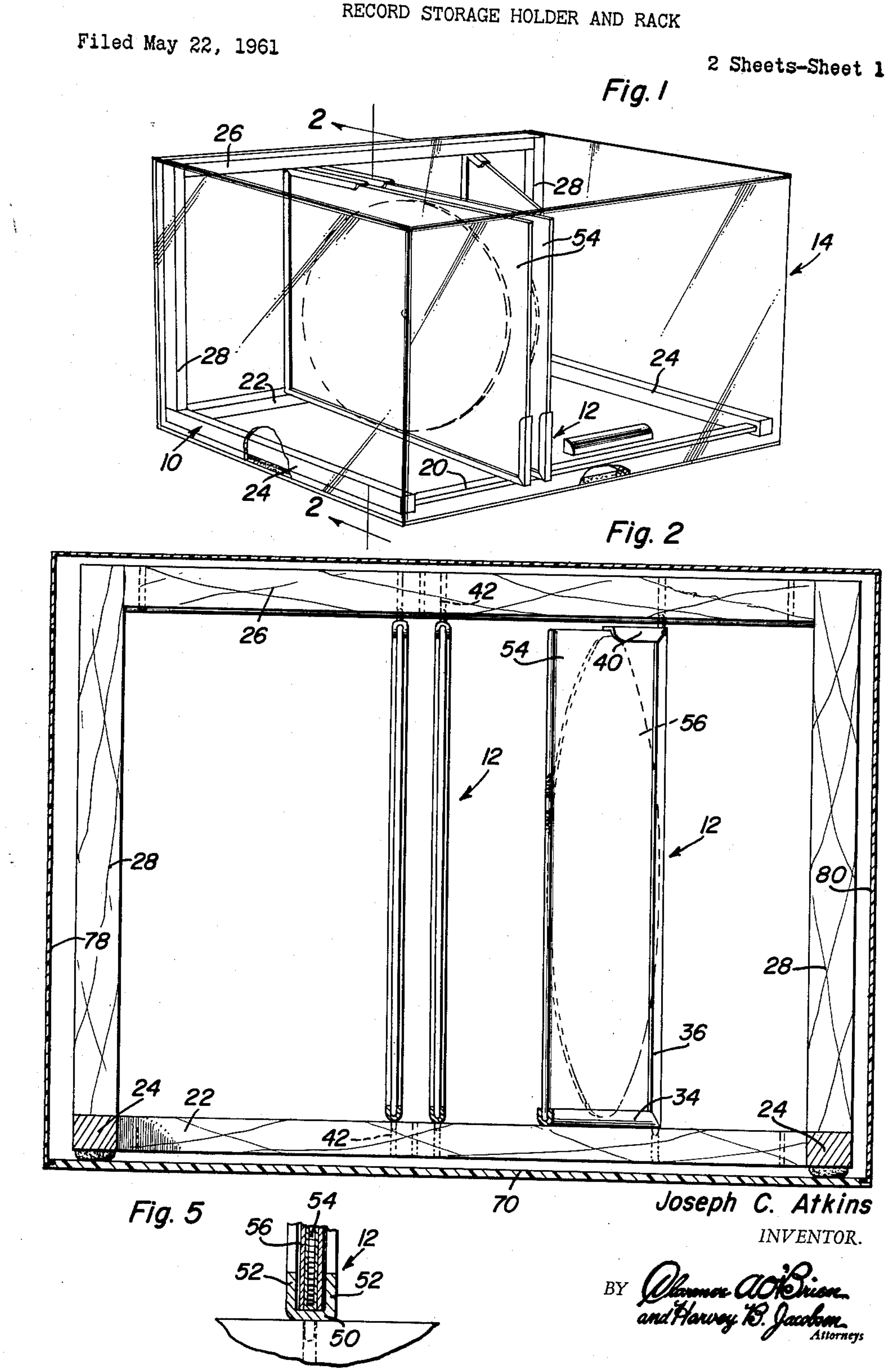
FIGURE 1 is a perspective view showing a record storage device in accordance with the present invention and showing for simplicity of illustration three records in their jackets and in their holders mounted therein.
FIGURE 2 is a vertical longitudinal sectional view through the apparatus of FIGURE 1 but upon a slightly enlarged scale and taken substantially upon the plane indicated by the section line 2—2 of FIGURE 1.
FIGURE 5 is a detail view in vertical longitudinal section and showing in cross section the configuration of a portion of a record holder.

The record storage device in accordance with this invention consists of a rack or support frame indicated generally by the numeral 10 (FIG. 1), a series of individual record holders each indicated generally by the numeral 12 and pivotally mounted in the frame for horizontal swinging movement about vertical axes therein together with an enclosing cabinet 14 of a generally transparent material.

Considering first the support rack 10, it is to be understood that the latter consists of upper and lower rear cross members 26 and 22 which are preferably rigidly connected together by side frame members as at 28 to form a frame-like back for the rack. The front cross member 20 can be and preferably is rotaably mounted. As will be best apparent from a consideration of FIGURE 4, there is also provided in addition to the upper and lower rear cross members 26 and 22 respectively a front cross member 20 disposed horizontally in front of the lower cross member 22 and maintained in semi-fixed spaced relation thereto by means of the horizontal frame members or elements as at 24. As so far described, it will be apparent that the rack consists of a generally L-shaped structure having an open framework back wall consisting of the upper and lower cross members 26 and 22 with the vertical frame members 28 therebetween, together with an open framework base member consisting of the front and rear cross members 20 and 22 with the connecting side frame members 24 therebetween. As will be observed from FIGURE 4, the upper and lower rear cross members 26 and 22 are provided with vertically aligned sets of bores 30 and 32 respectively therein which constitute the means by which the individual record holders 12 are pivotally but detachably affixed. As can be noted in FIGURE 4, the front cross member 20 will be in the horizontal position when the records are being pivotally swung and for storage it will be in the vertical position. Therefore, the reason for saying the front cross member 20 can be semi-fixed although for the purpose of the invention the front cross member 20 could consist of a rigid frame element as 24 and 28 to make the base and back rigidly fixed.

Figures 3, 4, 6:
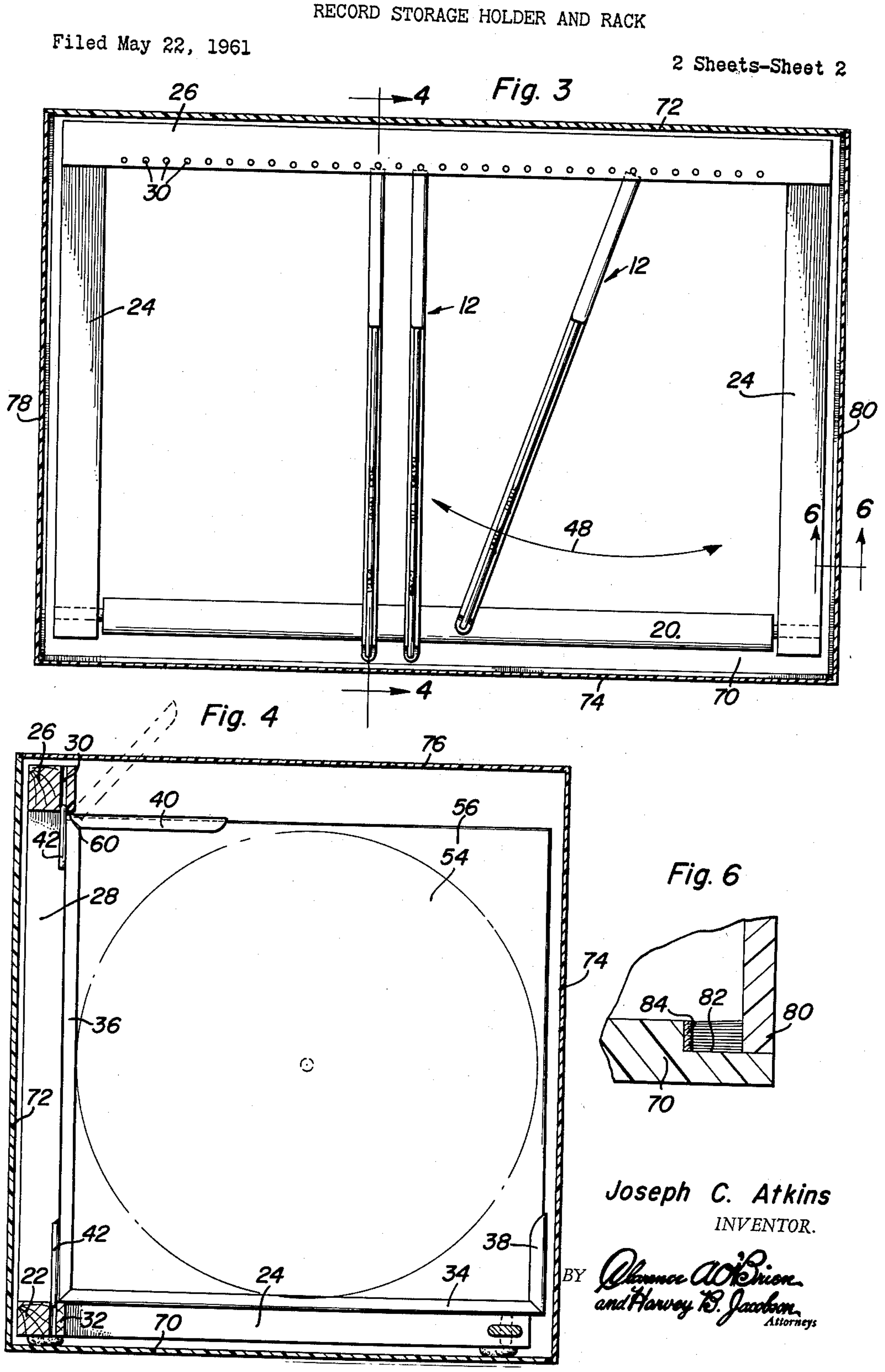
FIGURE 3 is a horizontal sectional view taken just below the top wall of the cabinet of FIGURE 1 and showing in plan further details of the structure of the device.
FIGURE 4 is a vertical transverse sectional view taken substantially upon the plane indicated by the section line 4—4 of FIGURE 3, alternative positions of a portion of a record holder being shown in full and dotted lines therein.
FIGURE 6 is a further detail view taken substantially upon the plane indicated by the section line 6—6 of FIGURE 3 and showing upon an enlarged scale a portion of the cabinet structure of the device.

The record holders 12 each consists of a relatively rigid open framework comprising, as shown more clearly in FIGURE 4, a bottom wall 34, a rear wall 36, a fixedly secured front wall 38 together with a hingedly mounted top wall 40. Secured in any suitable manner as by welding or the like to the back wall 36 are a pair of vertically extending and projecting pintles or pivots 42 and 44 which are of sufficient size to be pivotally and securely received within the bores 30 and 32 of the top and bottom cross members 26 and 22 respectively. By means of a pair of vertically aligned pivots, each of the record holders 12 is pivotally secured to the back wall between the top and bottom cross members 26 and 22 therein for horizontal swinging movement about the vertical axis extending through the two pivots. This relationship is shown in FIGURE 3 wherein the swinging movement of one of the records is indicated by the arrow 48 therein. Any suitable means may be provided for removably securing each of the record holders in its pivotal mounting in the back wall portion of the rack. Thus, the pivot pins could be fixedly secured in their pivotal mounting at the time the upper or lower cross members 26 or 22 are secured into the back wall structure of the rack. Alternatively, the pivot members may be attached after the record holders are positioned between these cross members. Inasmuch as the invention claimed herein does not reside in the particular manner by which the record holders are assembled into the rack structure of the device, and since various means could be provided for this purpose, within the ability of a skilled mechanic, a further description of the same is deemed to be unnecessary.

It should be noted, however, that the dimensions are such that when once a record holder is pivotally mounted as shown in the drawings, the bottom wall 34 thereof will rest upon and be supported by the front and rear cross members 20 and 22, thereby serving to support and render the structure of the holder more durable.

It is to be understood that in cross sectional configuration each of the front, bottom, rear and top walls of a record holder are U-shaped in cross section, as will be readily apparent from FIGURE 5. Thus, each of these elements preferably comprises a channel member having a central or medial web or flange as at 50 with a pair of upstanding parallel side walls or side flanges as at 52. The spacing between these flanges is such that a given record holder will accommodate a given size of album. Thus, a record disc as at 54, received within its jacket or envelope as at 56 may be snugly received within the channel provided by the partial frame of the record holder 12.

It is important to note that the front wall 38 of each record holder terminates at a relatively short distance above the bottom wall to provide an open portion of the rectangular frame of the record holder. In a similar manner, the top wall 40 terminates at a short distance from the back wall, to which it is pivotally connected as by a hinge 60. As a result of this arrangement there is provided a considerable open space between the adjacent ends of the front and top walls 38 and 40 which enables the record and its record jacket or a record to be readily placed into or removed from the channel shaped walls of the record holder when the top wall 40 is raised from its solid line lowered position shown in FIGURE 4 to the dotted line position indicated therein.

Owing to the open character of the record holders, it is possible to readily read the labels affixed to either side of the record by merely horizontally swinging the record holder in its pivotal mounts as suggested in FIGURE 3.

Referring next to the cabinet element 14 of the assembly, it is to be noted that the same consists of a box-like structure consisting of a base or bottom wall 70 which underlies and supports the bottom surfaces of the support rack 10. Removably received upon this bottom wall or base of the cabinet structure is a hood or top portion which comprises a back wall 72, a front wall 74, a top wall 76 and a pair of end walls as at 78 and 80. Preferably the top, back, front and end walls of the cabinet are of a transparent material so as to permit ready visibility of the various record holders and their record discs therewithin. Preferably, however, the bottom wall 70 is of a translucent or opaque material.

It is also preferred to hingedly connect at least some of these transparent walls to each other, as for example to hingedly connect the front wall 74 to the top wall 76 while the latter is hingedly connected to the rear wall 72, and the two end walls 78 and 80 are hingedly connected to the vertical edges of the back wall. In this manner ready access can be had to any portion of the interior of the cabinet in order to horizontally swing one or more of the record holders and thus visually inspect the record contained therein.

In order to insure a dust tight seal between the hood portion of the cabinet and the base wall 70 thereof, it is preferred to provide a construction such as that more clearly indicated in the detail view of FIGURE 6. As shown therein, the marginal edge portion of the top surface of the base or bottom wall 70 is provided with a recessed portion 82 which provides a stepped seat in which the lower edge of the adjacent front, rear or end walls of the cabinet may be received. A flocked material 84 may line or coat the surface of this recessed portion in order to further enhance the dustproof sealing engagement established at this location. Suitable fasteners, not shown, may be provided to detachably or releasably secure the hood portion of the cabinet to the base portion thereof. The arrangement is such that when the rack structure 10 is received upon the bottom wall or base 70 of the cabinet, and the hood portion thereof is placed thereon, the rack structure will be snugly and securely enclosed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A record storage device comprising a rack embodying a support including a base frame having parallel front and rear cross members and a back frame for said base frame including a top cross member parallel to and spaced above said rear cross member in fixed relation, a plurality of holders each comprising a frame for receiving a record therein, pivot means on each frame pivotally connected to said top and rear cross members and supporting said record holders in side-by-side position in vertical planes for horizontally swinging each about a vertical axis through its pivot means whereby to afford access to each side of a record jacket when held in its holder, each frame embodying a vertical back wall, a bottom wall and a front wall, said walls being U-shaped in cross-section and thus adapted to embrace the edges of a record jacket therein, said bottom wall being rigidly connected at its opposite ends to said back and front walls, said front wall being shorter vertically than the back wall in a manner to increase visibility of a record jacket in said holder and to facilitate its passage into and out of said holder.

2. The combination of claim 1 wherein each frame includes a top wall secured to said back wall and overlying a portion only of said frame bottom wall.

3. The combination of claim 2 wherein said frame top wall is hinged to said frame back wall.

4. A record storage device comprising a rack substantially L-shaped in end elevation including a base frame having parallel front and rear cross members and a back frame for said base frame including a top cross member parallel to and spaced above said rear cross member in fixed relation, a plurality of record holders each comprising a frame for receiving a record therein, pivot means on each frame pivotally connected to said top and rear cross members, respectively, and supporting said record holders in side-by-side position in vertical planes for horizontally swinging each about a vertical axis through its pivot means whereby to afford access to each side of a record jacket when held in its holder, said front cross member being disposed in a position rearwardly of the front vertical marginal portions of said holder frames when the latter are in their normally stationary positions, said record holders each comprising a frame having a vertical back wall, a horizontal bottom wall at right angles to said back wall, and a front wall parallel to the back wall and of a height appreciably less than the height of said back wall, said walls being of U-shaped configuration to embrace the edges of a record album.

5. A record storage device comprising a rack substantially L-shaped in end elevation including a base frame having parallel front and rear cross members and a back frame for said base frame including a top cross member parallel to and spaced above said rear cross member in fixed relation, a plurality of record holders each comprising a frame for receiving a record therein, pivot means on each frame pivotally connected to said top and rear cross members, respectively, and supporting said record holders in side-by-side position in vertical planes for horizontally swinging each about a vertical axis through its pivot means whereby to afford access to each side of a record jacket when held in its holder, said front cross member being disposed in a position rearwardly of the front vertical marginal portions of said holder frames when the latter are in their normally stationary positions, and in combination, a cabinet enclosing said rack and holders, said cabinet being readily applicable and removable and having top, bottom, side and end walls for completely and snugly enclosing said rack and holders, said cabinet base having a stepped marginal surface for receiving the lower edges of said side and end walls for completely and snugly enclosing said rack and holders, said cabinet base having a stepped marginal surface for receiving the lower edges of said side and end walls with a dust-tight joint.

References Cited in the file of this patent

UNITED STATES PATENTS

| | | |
|---|---|---|
| 1,012,606 | Davis | Dec. 26, 1911 |
| 1,172,754 | Wilkinson | Feb. 22, 1916 |
| 1,285,793 | Reeves | Nov. 26, 1918 |
| 1,948,738 | Thayer | Feb. 27, 1934 |
| 2,008,969 | Schwemer | July 23, 1935 |
| 2,321,794 | Braun | June 15, 1943 |
| 2,883,250 | Tod | Apr. 21, 1959 |
| 2,977,956 | Smith | Apr. 4, 1961 |